(12) United States Patent
He et al.

(10) Patent No.: US 8,230,217 B2
(45) Date of Patent: Jul. 24, 2012

(54) METHOD AND SYSTEM FOR SECURE COLLABORATION USING SLEPIAN-WOLF CODES

(75) Inventors: Dake He, Waterloo (CA); Ashish Jagmohan, Irvington, NY (US); Ligang Lu, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 12/250,115

(22) Filed: Oct. 13, 2008

(65) Prior Publication Data

US 2010/0095116 A1    Apr. 15, 2010

(51) Int. Cl.
 *H04L 29/06*    (2006.01)
(52) U.S. Cl. ........................................ 713/168
(58) Field of Classification Search .................. 713/168
 See application file for complete search history.

(56) References Cited

U.S. PATENT DOCUMENTS

| | | | |
|---|---|---|---|
| 5,465,353 A | | 11/1995 | Hull et al. |
| 5,926,549 A * | | 7/1999 | Pinkas .......................... 713/168 |
| 7,187,804 B2 | | 3/2007 | Zhao et al. |
| 7,240,210 B2 | | 7/2007 | Mihcak et al. |
| 7,271,747 B2 | | 9/2007 | Baraniuk et al. |
| 7,675,867 B1 * | | 3/2010 | Mraz et al. ..................... 370/254 |
| 2006/0050869 A1 | | 3/2006 | Tuvell et al. |
| 2006/0123241 A1 | | 6/2006 | Martinian et al. |
| 2006/0197686 A1 | | 9/2006 | Liu et al. |
| 2007/0118877 A1 | | 5/2007 | Karabulut |
| 2008/0291065 A1 * | | 11/2008 | Lu et al. .......................... 341/107 |
| 2009/0055651 A1 * | | 2/2009 | Girod et al. .................... 713/176 |
| 2009/0122868 A1 * | | 5/2009 | Chen et al. ............... 375/240.22 |

OTHER PUBLICATIONS

Lin et al., "Image Authentication Based on Distributed Source Coding", IEEE International Conference on Image Processing, vol. 3, Sep. 16, 2006-Oct. 19, 2007, pp. III-5-III-8.
Haleem et al., "Joint Distributed Compression and Encryption of Correlated Data in Sensor Networks", MILCOM 2006, Oct. 23-25, 2006, 7pp.
Cam et al., "Secure Data Aggregation and Source-Channel Coding with MIT Wireless Sensor Networks", 24th IEEE International Performance, Computing and Communications Conference, Apr. 7-9, 2005, pp. 377-382.
Capra, "Engineering Human Trust in Mobile System Collaborations", UCL-CS SSE Seminar, Oct. 25, 2004, pp. 107-116.
Krukow et al., "A Framework for Concrete Reputation-Systems with Applications to History-Based Access Control", Proceedings of the 12th ACM Conference on Computer and Communications Security, 2005, pp. 260-269.
Liu et al, "On Optimal Communication Cost for Gathering Correlated Data Through Wireless Sensor Networks", MobiCom '06: Proceedings of the 12th Annual International Conference on Mobile Computing and Networking, Sep. 2006, pp. 310-321.

* cited by examiner

*Primary Examiner* — Michael S McNally
(74) *Attorney, Agent, or Firm* — Whitham, Curtis, Christofferson & Cook, P.C.; Brian P. Verminski

(57) ABSTRACT

A method and system provide for secure sharing of arbitrary data between users with limited mutual trust. A user can encode its information by using a Slepian-Wolf code at a rate which enables a second user to correctly decode only if the side-information it has satisfies a conditional entropy constraint. The key advantages are as follows. Firstly, it is very flexible, in that it enables secure sharing for general data including multimedia data. Secondly, by appropriate Slepian-Wolf code selection, it enables compression in conjunction with security. Thirdly, it can be used for the case where the data model is imperfectly known and trust is to be built up incrementally.

20 Claims, 6 Drawing Sheets

METHOD AND SYSTEM FOR SECURE COLLABORATION USING SLEPIAN-WOLF CODES

BACKGROUND OF THE INVENTION

1. Field of the Invention

The present application generally relates to a method and system for secure collaboration between two users, and, more particularly, a method and system which uses communication of Slepian-Wolf information to ensure secure sharing.

2. Background Description

The problem addressed by this invention is that of secure sharing of information between users (say, User A and User B) with limited mutual trust. Specifically, the scenario considered is one where the first user wants to share information (termed source data or source information) with the second user but only if the second user already has correlated information (termed side-information). This scenario is of practical importance in applications involving information sharing among entities with limited mutual trust.

An example of this is secure sharing of medical information among doctors where, due to privacy concerns, doctor A only wishes to share those medical records for which doctor B already has a correlated (e.g., a somewhat degraded) copy. In such a case, the source information X may consist of medical imaging records (such as CT scan data) and side-information Y may consist of related data captured with a similar but non-identical imaging modality (such as lower-resolution CT data). In this case, the collaboration may be asymmetric (user A transmits information to user B) or symmetric (both users transmit and receive information). The data shared, in general, may be multimedia data wherein the possible side-informations and the source may have a non-trivial correlation structure. Further, User A may or may not know the correlation between the source and the possible side-informations exactly, and there may be a cost associated with the use of the communication channel (for example, bandwidth might be limited). Thus, User A may want to transmit information to User B incrementally untill a predefined limit.

FIG. 1 is a block diagram illustrating the scenario considered. Prior to communication, User A 150 has access to the source data X 100, and User B 151 has access to side-information Y 105. The side-information Y 105 may be one of two possible side-informations $Y_1$ 101 or $Y_2$ 102. The information $Y_1$ 101 is correlated to the source-data X 100, with the correlation structure represented by a hypothetical correlation channel 103, which embodies for example the joint probability distribution of X and $Y_1$. The information $Y_2$ 101 is uncorrelated or only poorly correlated to the source-data X 100. The hypothetical single-output selector 104, with inputs $Y_1$ and $Y_2$ and output equal to one of the two inputs, represents the fact that the side-information Y 105 can be equal to either $Y_1$ or $Y_2$. The problem considered is as follows. User A 150 would like to transmit sufficient data over the data communication channel 152 such that User B 151 would be able to obtain source data X 100, but only if the side-information Y 105 possessed by User B is equal to the correlated side-information $Y_1$ 101, and not if it is equal to the poorly correlated side-information data $Y_2$ 102. For example, in the context of the medical information sharing example discussed above, source data X 100 would represent the medical records to be shared, side-information $Y_1$ would represent information about the same patient taken with a different modality, while $Y_2$ might represent information about other patients (which would, thus, not be correlated with X).

Prior art related to the present invention may be classified into the following categories. A first related system is the one described in the paper by Lin et al., titled "Image Authentication Based on Distributed Source Coding", *Proceeding of the Intnl. Conf. on Image Processing* 2007, volume 3, pages 5-8. However, the system described therein does not allow encoder and decoder interaction, and thus the decoder largely plays a passive role in authentication. Further, it does not allow the encoder and decoder to build trust in an online, incremental fashion.

A second class of related prior methods uses cryptographic methods alone for secure communication or verification of trust. Examples of this class of solutions include the methods described in U.S. Patent Application Publication US20060050869A1 for "Method and apparatus for managing secure collaborative transactions" and U.S. Patent Application Publication US20070118877A1 for "Method and system for secured online collaboration". The main shortcoming of these approaches is that these are severely restrictive because they require the valid side-information to be identical to the source, and hence cannot be used when the source and side-information are media information which may be correlated but non-identical. Thus, the utility of this approach is severely limited in applications such as that listed above.

Another related class of prior methods utilise hash functions for access control. These include the methods described in U.S. Pat. No. 7,240,210 for "Hash value computer of content of digital signals decoder feedback", U.S. Pat. No. 5,465,353 for "Image matching and retrieval by multi-access redundant hashing", and U.S. Patent Application Publication US20060123241A1 for "Biometric based user authentication and data encryption". The main shortcomings of these methods in the current context are that these are restricted to a particular domain (e.g., a given class of images) and to a particular class of distortions (e.g., compression). Further, the decoder cannot reconstruct the source data from the side-information in the first two publications mentioned above.

SUMMARY OF THE INVENTION

According to the present invention, there is provided a method and system for secure sharing of arbitrary data between users with limited mutual trust. The key idea is that a user can encode its information by using a Slepian-Wolf code at a rate which enables a second user to correctly decode only if the side-information it has satisfies a conditional entropy constraint. The preferred embodiment of the invention includes the following steps at the encoder:

1. Slepian-Wolf rate estimation given a statistical model or a class of statistical models relating the source and side-information data;
2. Application of a lossy or lossless transform to the source data;
3. Evaluation of a hash value from the source, possibly after a process of lossy transform and reconstruction, using an appropriate hash function computer;
4. Application of a Slepian-Wolf code which may be rateless, in order to generate Slepian-Wolf bits, given the source;
5. Transmission of the Slepian-Wolf bits to the decoder in one or more increments till a rate limit is reached;
6. Comparison of a hash value received from the decoder and the hash value computed at the encoder; and 7. Possible transmission of additional data based on the hash value comparison;

and, at the decoder:

8. Slepian-Wolf decoding of the source given prior side-information and Slepian-Wolf bits received from the source;
9. Reconstruction of the source;
10. Evaluation of a hash value from the source reconstruction using an appropriate hash function computer; and
11. Transmission of the computed hash value to the encoder.

The key advantages of the invention are as follows. Firstly, it is very flexible in that it enables secure sharing for general data including multimedia data. Secondly, by appropriate Slepian-Wolf code selection, it enables compression in conjunction with security. Thirdly, it can be used for the case where the data model is imperfectly known and trust is to be built up incrementally.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
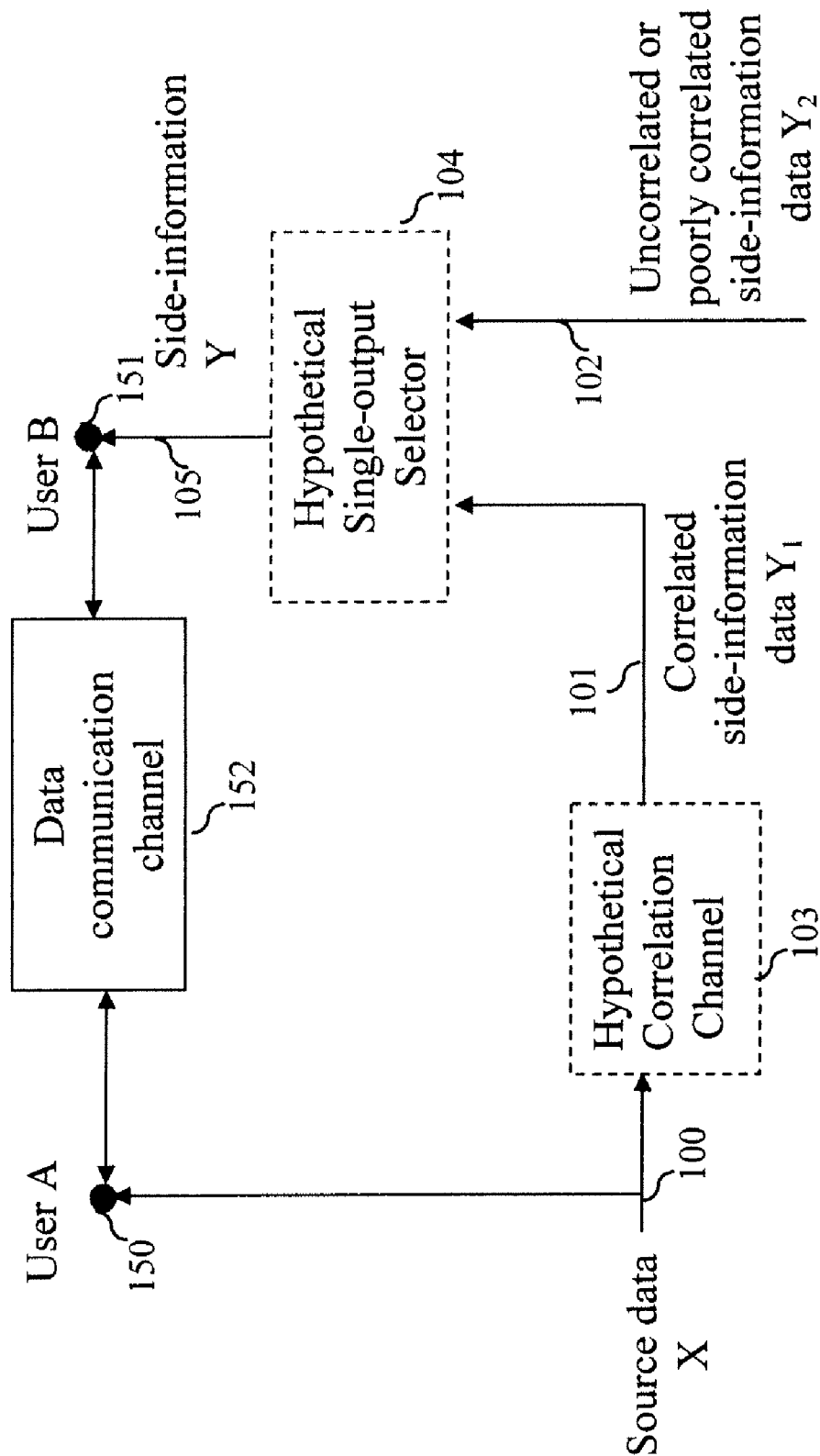
FIG. 1 is a block diagram of the scenario considered according to the invention.
Figure 2:
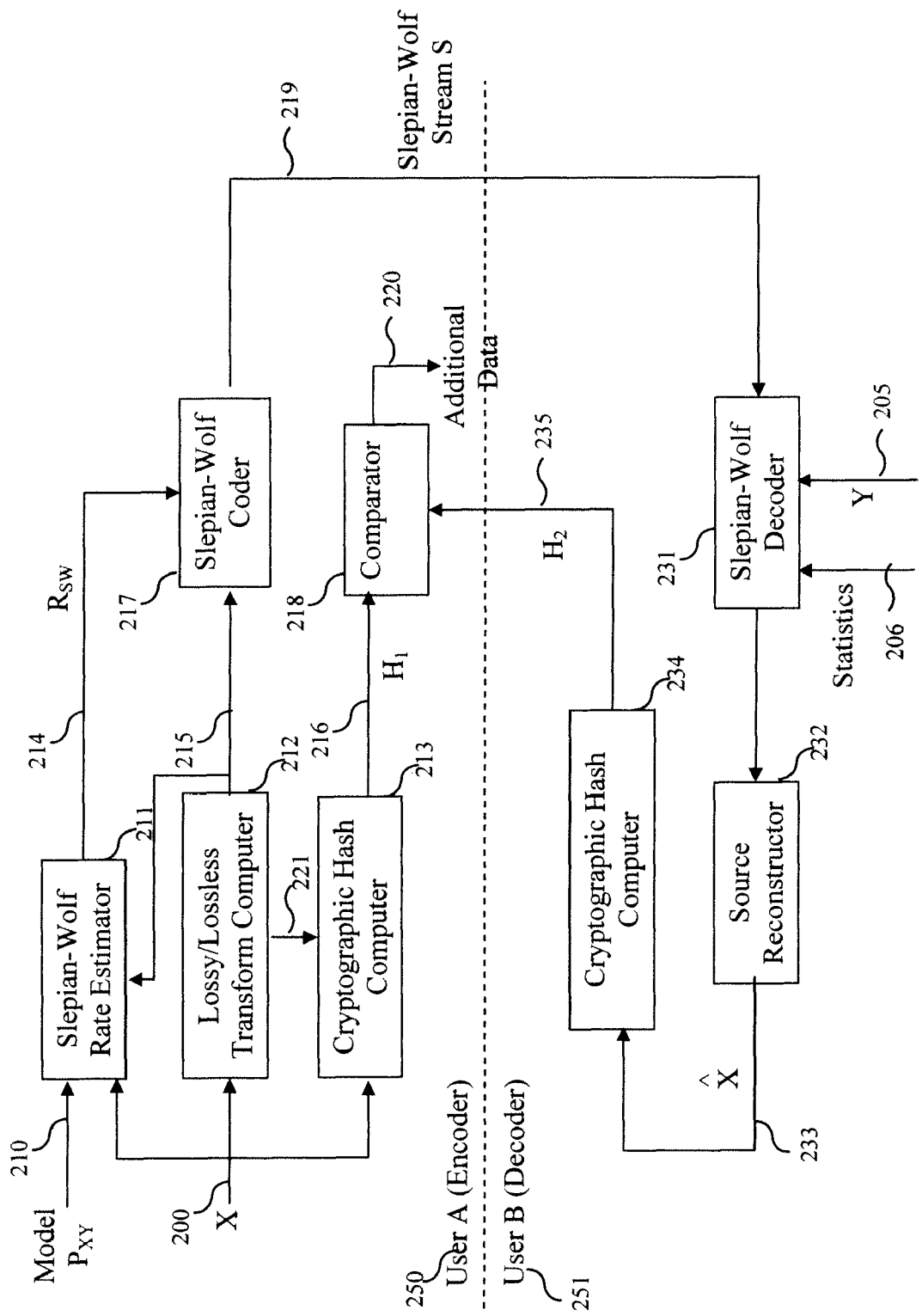
FIG. 2 is a block diagram of the secure collaboration system according to the preferred embodiment of the invention.

Referring now to the drawings, and more particularly to FIG. 2, there is illustrated an exemplary embodiment of a Slepian-Wolf codes based secure collaboration system with two users. User A 250 is assumed to be the transmitter (encoder) of data, and User B 251 is assumed to be the recipient (decoder) of data. Note that it is trivial to extend this to the case where User A and User B exchange data symmetrically; i.e., where both encoding and decoding is done by both users. This can be simply achieved, for example, through the use of time multiplexing and/or through bidirectional communication links.

The inputs to the encoder are the source signal X 200 and the statistical source model $P_{XY}$ 210 (hereinafter the source model 210). The source model 210 consists, in general, of the joint probability distribution for the source data X and the possible side-information signals $Y_1$, $Y_2$, etc. The source model 210 and the source signal 200 are input to the Slepian-Wolf rate estimator 211 which computes the Slepian-Wolf code rate to be used for securely communicating the source data to the decoder. In an exemplary embodiment, the Slepian-Wolf code rate estimator computes the encoding rate as a function of the source signal X 200, the source model 210, the sequence length of the source signal, and the code structure of the available Slepian-Wolf codes. For example the Slepian-Wolf rate estimator 211 can compute the Slepian-Wolf coding rate as $$R_{SW} = H(X \mid Y_1) + c\sqrt{\frac{\log n}{n}},$$

where $R_{SW}$ is the Slepian-Wolf coding rate, $H(X|Y_1)$ is the conditional entropy of X given $Y_1$, which can be determined from the joint probability distribution of X and $Y_1$, n is the sequence length of the source signal, and c is a predetermined constant. In an alternative embodiment, the rate estimator 211 uses, in addition, the statistical information about the other possible side-informations present at the decoder. For example it may compute the rate as $$R_{SW}^1 = H(X \mid Y_1) + c\sqrt{\frac{\log n}{n}}, \; R_{SW}^2 = H(X \mid Y_2) + c\sqrt{\frac{\log n}{n}}$$

$$R_{SW} = R_{SW}^1 + \frac{R_{SW}^2 - R_{SW}^1}{\beta}$$

for a fixed constant β. In an additional alternative embodiment, the rate estimator 211 computes the rate additionally as a function of the samples of the source signal 215 after a lossy or lossless transform. The output of the rate estimator consists of the Slepian-Wolf coding rate $R_{SW}$ 214.

The source signal X 200 is input to the lossy/lossless transform computer 212. When the source signal is an image or video sequence, in an exemplary embodiment, the transform computer 212 computes a discrete cosine transform of the signal, possibly followed by quantization. The output of the transform computer 212 is the signal 215 which consists of transformed samples of the source signal. In the case where a lossy transform is used, a second output of the transform is a reconstructed source signal 221. The Slepian-Wolf rate 214 and the transformed samples 215 are both input to the Slepian-Wolf coder 217, which selects one of a plurality of Slepian-Wolf codes based on the estimated Slepian-Wolf coding rate and applies the code to the transformed samples in order to generate the Slepian-Wolf output stream S 219. In an exemplary embodiment, the selected Slepian-Wolf code consists of a matrix whose dimensions are functions of the estimated coding-rate information and the number of transformed samples. In this embodiment, the matrix is multiplied with a vector derived from the transformed samples in order to generate the Slepian-Wolf information 219. In an additional exemplary embodiment, the matrix is the parity check matrix of an LDPC (Low-Density Parity-Check) code. In an additional exemplary embodiment, the matrix consists of the concatenation of a plurality of parity check and generator matrices of LDPC codes. In an additional exemplary embodiment, the Slepian-Wolf code is a linear function which allows for low computational-complexity generation of linear combinations of the transformed samples. In an additional exemplary embodiment, the Slepian-Wolf code consists of a non-linear function applied to a vector derived from the transformed samples to generate the Slepian-Wolf information 219.

The source signal X 200 is also input to the cryptographic hash computer 213, which applies a hash function to the source signal to compute a hash value $H_1$ 216. In an exemplary embodiment, the hash function used by the hash computer 213 is a numerical computation based on a known public key. In an alternative embodiment, the hash function used is a standard one-way compression function. In the case where a lossy transform is used, the cryptographic hash computer 213 applies a hash function to the reconstructed source signal 221, instead of to signal X 200, to compute the hash value $H_1$ 216. The encoder transmits the Slepian-Wolf stream bits 219 to the decoder 231 and waits for the decoder to reply with a hash value.

The decoder 231 at User B receives as an input the Slepian-Wolf stream 219, and also uses as inputs the a-priori known decoder side-information signal Y 205, and, possibly, some additional a-priori known statistics 206 about the correlation structure between the source and the possible side-informations. Signals 205, 206 and 219 are input to the decoder 231. The outputs of the decoder 231 are decoded transformed samples. In an exemplary embodiment, the decoder 231 performs maximum-likelihood decoding based on the side-information 205 and the statistics 206. In an additional embodiment, the decoder 231 uses the belief-propagation algorithm to perform an approximate maximum-likelihood estimate to generate the transform samples. In an additional embodiment, the decoder 231 uses minimum-distance decoding based on only the side-information 205. In an additional embodiment, the statistics signal 206 consists of knowledge in the form of a parametric probability distribution, and the decoder 231 computes the parameters of this distribution, prior to decoding, as a function of the received Slepian-Wolf code rate $R_{SW}$.

The transformed samples output by the Slepian-Wolf decoder are input to the source reconstructor 232, which outputs the reconstructed source 233. In an exemplary embodiment, when the source signal is an image or video, the source reconstructor performs inverse quantization using a public quantization codebook followed by an inverse discrete cosine transform in order to compute the reconstructed source symbol $\hat{X}$ 233. The reconstructed source symbol $\hat{X}$ 233 is input to the cryptographic hash computer 234 which applies a hash function to the reconstructed source symbol to compute a hash value $H_2$ 235. In an exemplary embodiment, the hash function used by the hash computer 234 is a numerical computation based on the same public key as used by the encoder. In an alternative embodiment, the hash function used is the same one-way compression function as used by the encoder. The hash value 235 is transmitted back to the encoder.

Upon receiving the hash value 235, the encoder uses a comparator 218 to compare hash values 216 and 235. In an exemplary embodiment, the comparator 218 declares that the hash value $H_2$ is valid if the signals 216 and 235 are identical. In an alternative embodiment, the comparator 218 applies a second hash function to the hash value 235 and declares that the hash value $H_2$ is valid if the resulting signal is identical to signal 216. In an additional alternative embodiment, the comparator 218 employs a prefixed distance metric and declares that the hash value $H_2$ is valid if the distance between signals 216 and 235 is lesser than a prefixed threshold. If the hash value $H_2$ is found to be valid, the encoder can transmit additional data 220 to the decoder, either in secure mode by reusing the secure collaboration system, or in the clear. If the hash value $H_2$ is found to be invalid, the encoder stops transmission.

Figure 3:
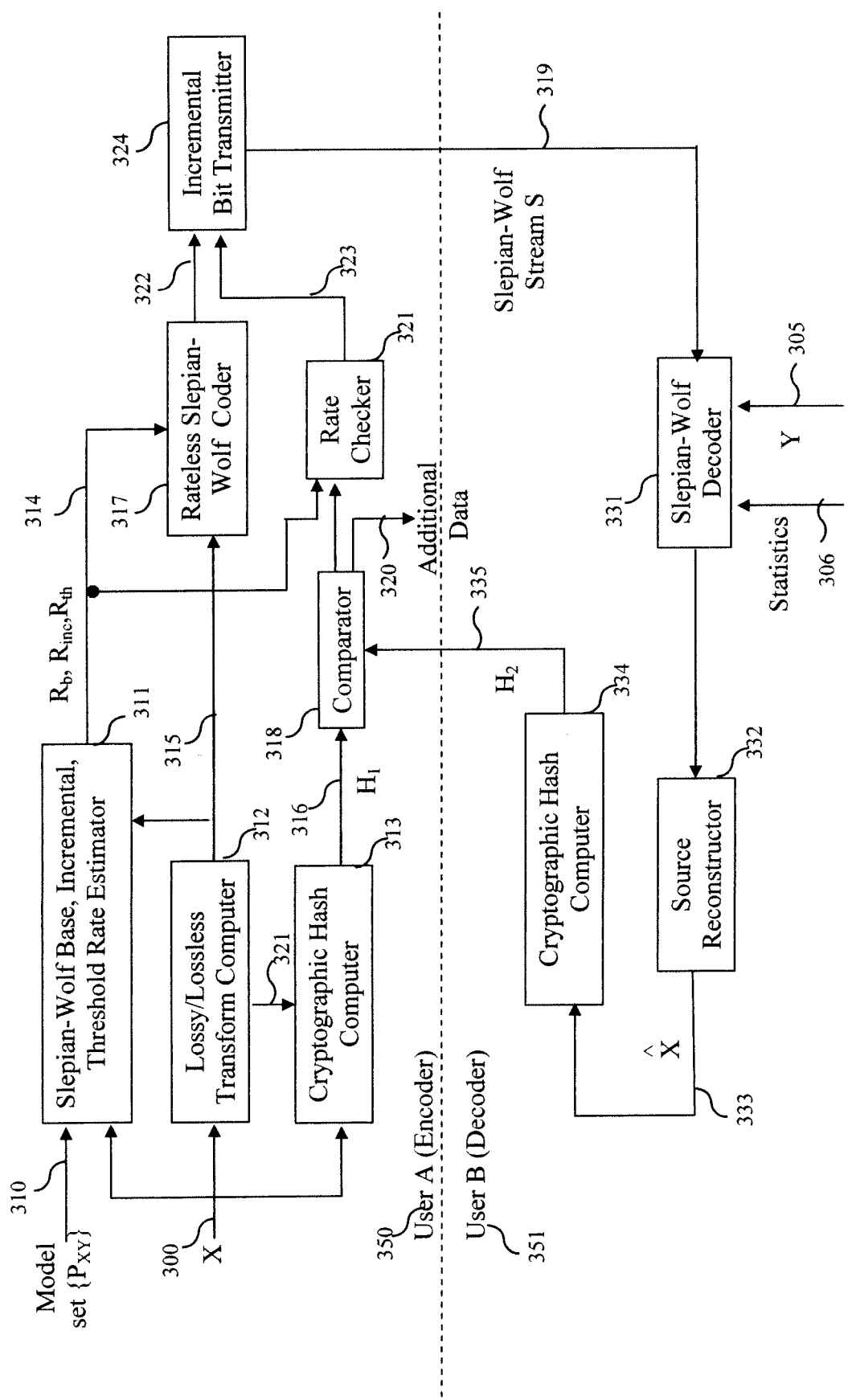
FIG. 3 is a block diagram of the secure collaboration system when incremental transmission of information is required, according to the preferred embodiment of the invention.

FIG. 3 depicts the preferred embodiment of the secure collaboration system in the case where incremental transmission of rate is used. The system depicted in FIG. 3 is useful when there is uncertainty about the correlation structure between source and side-information and when there is the need for conserving channel bandwidth between the encoder and the decoder.

The inputs to the encoder are the source signal X 300 and a set of statistical source model set $\{P_{XY}\}$ 310 (hereinafter the source model set 310). Each element of the source model set 310 consists, in general, of a joint probability distribution for the source data X and the possible side-information signals $Y_1, Y_2$, etc. The source model set 310 and the source signal X 300 are input to the Slepian-Wolf rate estimator 311 which computes a base Slepian-Wolf code rate ($R_b$), a Slepian-Wolf code-rate increment ($R_{inc}$), and a maximum threshold Slepian-Wolf code rate ($R_{th}$) to be used for securely communicating the source data to the decoder. In an exemplary embodiment, the Slepian-Wolf code rate estimator computes the rates $R_b$, $R_{inc}$ and $R_{th}$ as a function of the source signal X 300, the source model set 310, the sequence length of the source signal and the code structure of the available Slepian-Wolf codes. For example, the Slepian-Wolf rate estimator 311 can compute the following set of Slepian-Wolf coding rates $$R^i_{SW} = E_{\{P_{XY}\}}[H(X|Y_1)] + i \cdot c \sqrt{\frac{1}{n}}$$

where $E_{\{P\}}$ denotes the expectation taken over the set of probability distributions $\{P\}$, $\{R^i_{SW}\}$ is a set of Slepian-Wolf coding rates, $H(X|Y_1)$ is the conditional entropy of X given $Y_1$ which can be determined from a fixed joint probability distribution of X and $Y_1$, n is the sequence length of the source signal, and c is a predetermined constant. The Slepian-Wolf rate estimator then sets $$R_b = R_{SW}^0, R_{inc} = R_{SW}^1 - R_{SW}^0, R_{th} = R_{SW}^{i_{max}}$$

for predetermined $i_{max}$. In an alternative embodiment, the rate estimator 311 uses, in addition, the statistical information about the other possible side-informations present at the decoder. In an additional alternative embodiment, the rate estimator 311 computes the rate additionally as a function of the samples of the source signal 315 after a lossy or lossless transform. The output of the rate estimator consists of the Slepian-Wolf coding rates $R_b$, $R_{inc}$ and $R_{th}$ 314.

The source signal 300 is input to the lossy/lossless transform computer 312. When the source signal is an image or video sequence, in an exemplary embodiment, the transform computer computes a discrete cosine transform of the signal, possibly followed by quantization. The output of the transform computer is the signal 315 which consists of transformed samples of the source signal. In the case where a lossy transform is used, a second output of the transform is a reconstructed source signal 321. The Slepian-Wolf rates 314 and the transformed samples 315 are both input to the rateless Slepian-Wolf coder 317, which selects one of a plurality of Slepian-Wolf codes based on the estimated Slepian-Wolf threshold rate $R_{th}$, and applies the code to the transformed samples, in order to generate the Slepian-Wolf output stream 322. In an exemplary embodiment, the selected Slepian-Wolf code is a rateless linear code and the Slepian-Wolf coder computes a mixture of syndrome and parity bits, which can be punctured so as to generate a Slepian-Wolf code bit stream which can be transmitted incrementally. The output 322 of the rateless Slepian-Wolf coder 317 is input to the incremental rate transmitter 324, which initially transmits to the decoder a subset of the Slepian-Wolf code bits, with rate equal to the estimated base Slepian-Wolf code rate $R_b$.

The source signal 300 is also input to the cryptographic hash computer 313, which applies a hash function to the source signal to compute a hash value $H_1$ 316. In an exemplary embodiment, the hash function used by the hash computer 313 is a numerical computation based on a known public key. In an alternative embodiment, the hash function used is a standard one-way compression function. In the case where a lossy transform is used, the cryptographic hash computer 313 applies a hash function to the reconstructed source signal 321, instead of to signal 300, to compute the hash value $H_1$ 316. The initial output of the encoder is the Slepian-Wolf stream S 319, which has rate $R_b$. The encoder transmits this stream to the decoder 331 and waits for the decoder to reply with a hash value.

The decoder 331 at User B, receives as an input the Slepian-Wolf stream 319, and also uses as inputs the a-priori known decoder side-information signal Y 305 and, possibly, some additional a-priori known statistics 306 about the correlation structure between the source and the possible side-informations. Signals 305, 306 and 319 are input to the decoder 331. The outputs of the decoder 331 are decoded transformed samples. In an exemplary embodiment, the decoder 331 performs maximum-likelihood decoding based on the side-information 305 and the statistics 306. In an additional embodiment, the decoder 331 uses the belief-propagation algorithm to perform an approximate maximum-likelihood estimate to generate the transform samples. In an additional embodiment, the decoder 331 uses minimum-distance decoding based on only the side-information 305. In an additional embodiment, the statistics signal 306 consists of knowledge of the form of a parametric probability distribution, and the decoder 331 computes the parameters of this distribution, prior to decoding, as a function of the received Slepian-Wolf code rate $R_{SW}$.

The transformed samples output by the decoder 331 are input to the source reconstructor 332, which outputs the reconstructed source symbol $\hat{X}$ 333. In an exemplary embodiment, when the source signal is an image or video, the source reconstructor performs inverse quantization using a public quantization codebook followed by an inverse discrete cosine transform in order to compute the reconstructed source symbol $\hat{X}$ 333. The reconstructed source symbol $\hat{X}$ 333 is input to the cryptographic hash computer 334 which applies a hash function to the reconstructed source symbol $\hat{X}$ 333 to compute a hash value $H_2$ 335. In an exemplary embodiment, the hash function used by the hash computer 334 is a numerical computation based on the same public key as used by the encoder. In an alternative embodiment, the hash function used is the same one-way compression function as used by the encoder. The hash value 335 is transmitted back to the encoder.

Upon receiving the hash value 335, the encoder uses a comparator 318 to compare hash values 316 and 335. In an exemplary embodiment, the comparator declares that the hash value $H_2$ is valid if the signals 316 and 335 are identical. In an alternative embodiment, the comparator 318 applies a second hash function to the hash value 335 and declares that the hash value $H_2$ is valid if the resulting signal is identical to signal 316. In an additional alternative embodiment, the comparator employs a prefixed distance metric and declares that the hash value $H_2$ is valid if the distance between signals 316 and 335 is lesser than a prefixed threshold. If the hash $H_2$ is found to be valid, the encoder can transmit additional data 320 to the decoder, either in secure mode by reusing the secure collaboration system, or in the clear. If the hash value $H_2$ is found to be invalid, the rate checker 321 is used to check if the current Slepian-Wolf coding rate can be incremented. This is done by comparing the sum of the current Slepian-Wolf rate $R_{SW}$ and the incremental Slepian-Wolf rate $R_{inc}$ to the threshold rate $R_{th}$. If $R_{SW}+R_{inc}>R_{th}$, the encoder ends transmission; otherwise, the rate checker increments the current rate to $R_{SW}+R_{inc}$, and incremental bit transmitter 324 is used to transmit an additional $R_{inc}$ bits to the decoder. Subsequently, the encoder waits for the decoder to reply with a hash value. This process is repeated untill either the decoder hash is validated, or until transmission ends because the rate cannot be incremented further.

Figure 4:
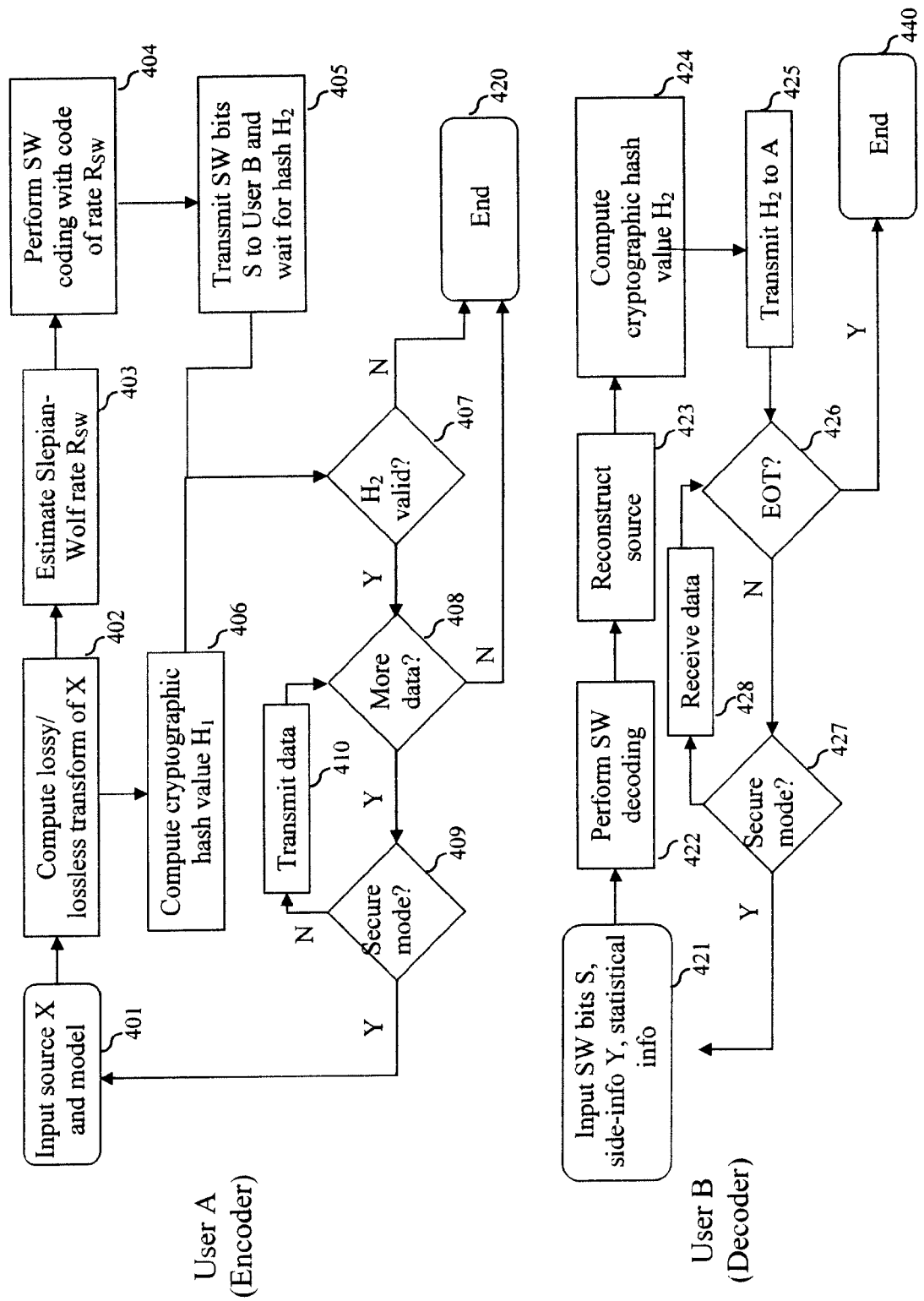
FIG. 4 is a flow diagram of the secure collaboration method according to the preferred embodiment of the invention.

FIG. 4 is a flow diagram depicting the preferred embodiment of the secure collaboration method with two users. The inputs to the encoder in step 401 are the source signal X and the statistical source model $P_{XY}$. In step 402, a lossy/lossless transform is computed from the source signal. When the source signal is an image or video sequence, in an exemplary embodiment, step 402 involves computation of a discrete cosine transform of the signal, possibly followed by quantization. The output of this step is a signal consisting of the transformed samples of the source signal. In the case where a lossy transform is used, a second output of this step is a reconstructed source signal. In step 403, the source model and the source signal are used to estimate the Slepian-Wolf coding rate, which is rate to be used for securely communicating the source data to the decoder. In an exemplary embodiment, step 403 involves computing the encoding rate as a function of the source signal, the transformed samples of the source signal, the input model statistics, the sequence length of the source signal, and the code structure of the available Slepian-Wolf codes. In an alternative embodiment, this step involves computing the Slepian-Wolf coding rate additionally as a function of the statistical information about the other possible side-informations present at the decoder. The output of step 403 is the Slepian-Wolf coding rate $R_{SW}$.

In step 404, the Slepian-Wolf rate and the transformed samples are used to generate the Slepian-Wolf code bits. This is done by selecting one of a plurality of Slepian-Wolf codes based on the estimated Slepian-Wolf coding rate, and application of the code to the transformed samples, in order to generate the Slepian-Wolf output stream S. In an exemplary embodiment, the selected Slepian-Wolf code consists of a matrix whose dimensions are functions of the estimated coding-rate information and the number of transformed samples. In this embodiment, the matrix is multiplied with a vector derived from the transformed samples in order to generate the Slepian-Wolf information. In an additional exemplary embodiment, the matrix is the parity check matrix of an LDPC code. In an additional exemplary embodiment, the matrix consists of the concatenation of a plurality of parity check and generator matrices of LDPC codes. In an additional exemplary embodiment, the Slepian-Wolf code is a linear function which allows for low computational-complexity generation of linear combinations of the transformed samples. In an additional exemplary embodiment, the Slepian-Wolf code consists of a non-linear function applied to a vector derived from the transformed samples to generate the Slepian-Wolf information.

In step 405, the generated Slepian-Wolf bits are transmitted to the decoder and the encoder waits for the decoder to transmit back a hash value for validation. In step 406, the encoder computes a hash value $H_1$ by applying a hash function to the source signal. In an exemplary embodiment, the hash function used is a numerical computation based on a known public key. In an alternative embodiment, the hash function used is a standard one-way compression function. In the case where a lossy transform is used, the hash function is applied to the reconstructed source signal generated in step 402, instead of to the source signal, to compute the hash value $H_1$.

Once the encoder receives the decoder's hash value $H_2$, in step 407 the encoder decides if the received hash value is valid. In an exemplary embodiment, the hash value $H_2$ is determined to be valid if $H_1$ and $H_2$ are identical. In an alternative embodiment, a second hash function is applied to the hash value $H_2$, and $H_2$ is determined to be valid if the resulting signal is identical to signal $H_1$. In an additional alternative embodiment, step 407 uses a prefixed distance metric and declares that the hash value $H_2$ is valid if the distance between $H_1$ and $H_2$ is lesser than a prefixed threshold. If the hash $H_2$ is found to be invalid, the encoder ends transmission in step 420. If the hash $H_2$ is found to be valid, in step 408 the encoder determines if more data is to be transmitted. If no more data is to be transmitted, the encoder ends transmission in step 420. If more data is to be transmitted, the encoder determines in step 409 if the additional data is to be transmitted in secure mode. If secure mode is required for additional data, the encoder goes to step 401 and re-uses the described secure collaboration method. If secure mode is not required, the encoder transmits additional data without Slepian-Wolf coding in step 410. This process is continued until no more data is to be transmitted in step 408 (or until validation fails in step 407), at which point the encoder ends transmission.

The decoder at User B, in step 421 receives as an input the Slepian-Wolf bit-stream transmitted by the encoder, the prior side-information and any prior statistical information about the correlation structure between the source and the possible side-informations. In step 422, these inputs are used to perform Slepian-Wolf decoding, which produces as output the decoded transformed samples. In an exemplary embodiment, step 422 performs maximum-likelihood decoding based on the side-information and the statistics. In an additional embodiment, step 422 uses the belief-propagation algorithm to perform an approximate maximum-likelihood estimate to generate the transform samples. In an additional embodiment, step 422 uses minimum-distance decoding based on only the side-information. In an additional embodiment, the statistics signal consists of knowledge of the form of a parametric probability distribution, and in step 422 the parameters of this distribution are computed, prior to decoding, as a function of the received Slepian-Wolf code rate $R_{SW}$.

The transformed samples generated in step 422 are used in step 423 to reconstruct the source signal. In an exemplary embodiment, when the source signal is an image or video, step 423 involves inverse quantization using a public quantization codebook followed by an inverse discrete cosine transform in order to compute the reconstructed source symbols. In step 424, the reconstructed source signal is used to compute a hash value $H_2$. In an exemplary embodiment, the hash function used is a numerical computation based on the same public key as used by the encoder. In an alternative embodiment, the hash function used is the same one-way compression function as used by the encoder. In step 425, the computed hash value $H_2$ is transmitted back to the encoder, and the decoder waits for validation. In step 426, the decoder checks to determine if the transmission has been ended or not. In case transmission is ended (for example, if the hash value $H_2$ was not validated or if there is no more data to be received), the decoder terminates in step 440. If transmission is not ended, the decoder determines in step 427 if the additional data to be received is in secure mode. If secure mode is being used for additional data, the decoder goes to step 421, and re-uses the described secure collaboration method. If secure mode is not being used, the decoder receives the additional data without Slepian-Wolf decoding in step 428. This process is continued until the encoder ends transmission, at which point the decoder terminates.

Figure 5:
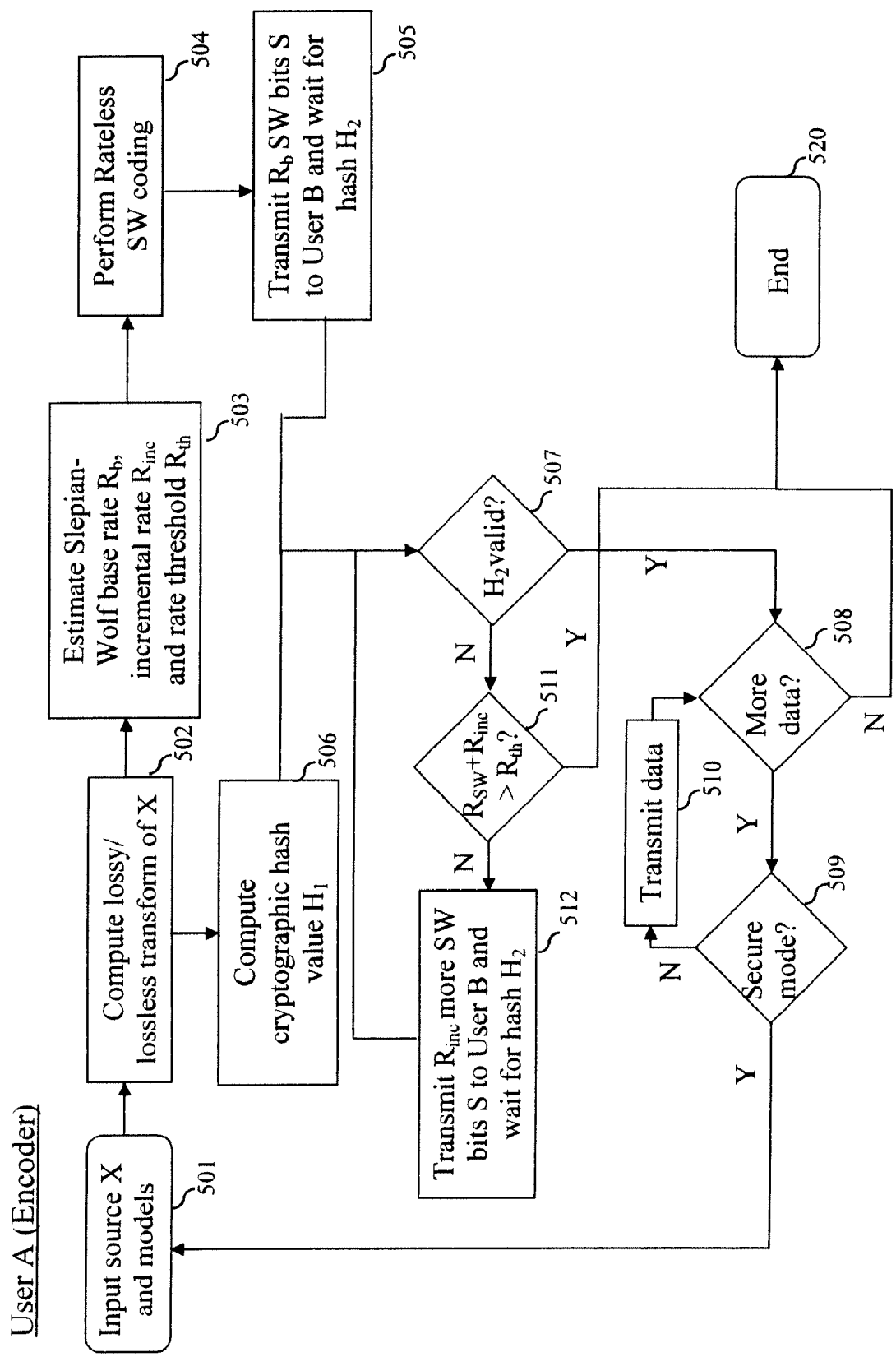
FIG. 5 is a flow diagram of the secure collaboration method used at the encoder, when incremental transmission of information is required, according to the preferred embodiment of the invention.
Figure 6:
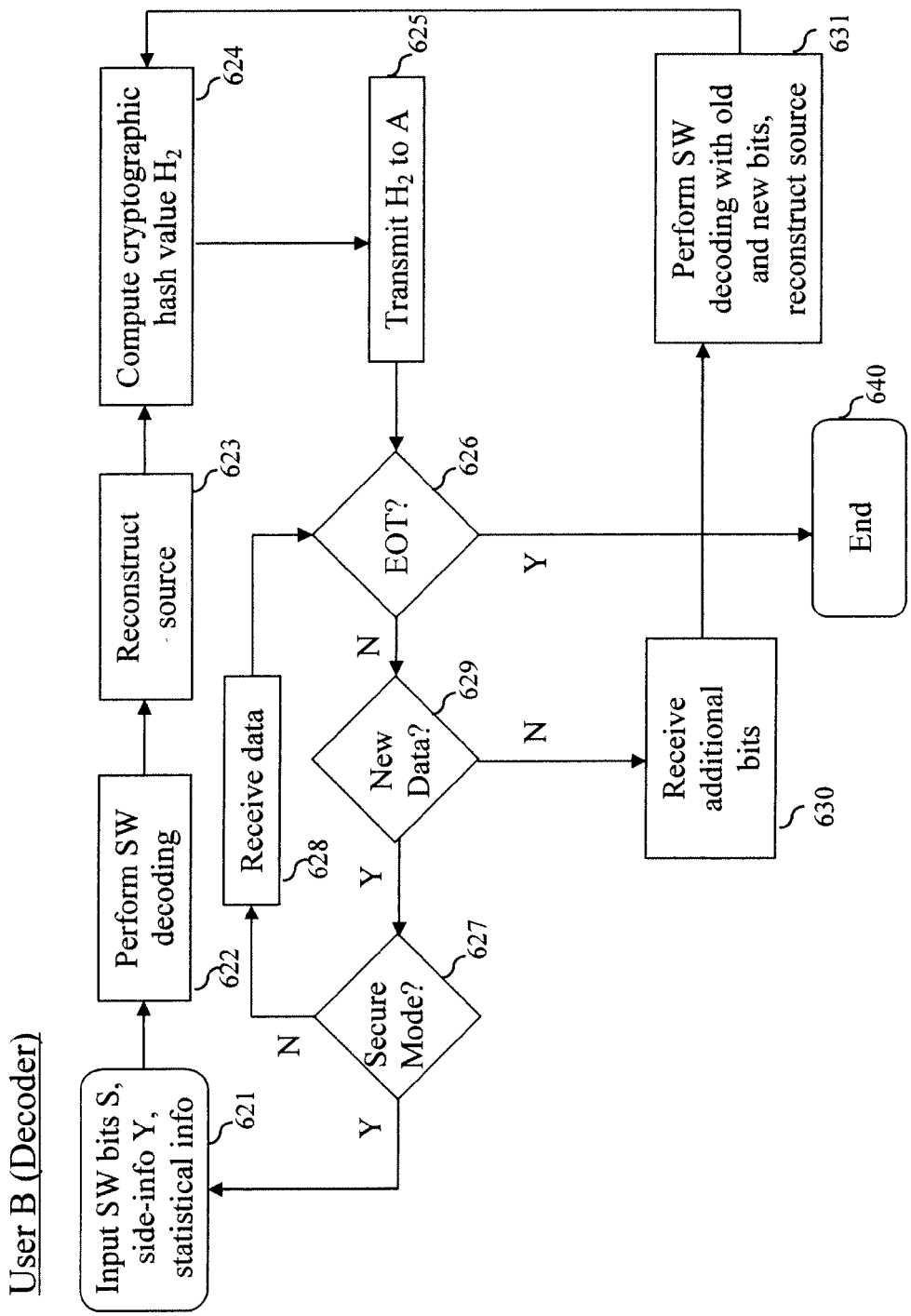
FIG. 6 is a flow diagram of the secure collaboration method used at the decoder, when incremental transmission of information is required, according to the preferred embodiment of the invention.

FIGS. 5 and 6 are flow diagrams depicting the preferred embodiment of the secure collaboration method used by the encoder and decoder, respectively, in the case where incremental transmission of rate is used. The method depicted in FIGS. 5 and 6 is useful when there is uncertainty about the correlation structure between source and side-information and when there is the need for conserving channel bandwidth between the encoder and the decoder.

In FIG. 5, the inputs to the encoder in step 501 are the source signal X and a set of statistical source models $\{P_{XY}\}$. In step 502, a lossy/lossless transform is computed from the source signal. When the source signal is an image or video sequence, in an exemplary embodiment, step 502 involves computation of a discrete cosine transform of the signal, possibly followed by quantization. The output of this step is a signal consisting of the transformed samples of the source signal. In the case where a lossy transform is used, a second output of this step is a reconstructed source signal. In step 503, the source model set and the source signal are used to compute a base Slepian-Wolf code rate ($R_b$), a Slepian-Wolf code-rate increment ($R_{inc}$), and a maximum threshold Slepian-Wolf code rate ($R_{th}$) to be used for securely communicating the source data to the decoder. In an exemplary embodiment the rates $R_b$, $R_{inc}$, and $R_{th}$ are computed as a function of the source signal, the transformed samples generated in step 502, the input set of model statistics, the sequence length of the source signal, and the code structure of the available Slepian-Wolf codes.

In step 504, the estimated Slepian-Wolf rates and the transformed samples are used to generate the Slepian-Wolf code bits. This is done by selecting one of a plurality of rateless Slepian-Wolf codes based on the estimated Slepian-Wolf threshold rate $R_{th}$, and applying the code to the transformed samples, in order to generate the Slepian-Wolf output stream. In an exemplary embodiment, the selected Slepian-Wolf code is a rateless linear code, and step 504 involves computation of a mixture of syndrome and parity bits, which can be punctured so as to generate a Slepian-Wolf code bit stream which can be transmitted incrementally. The output of step 504 is input to step 505, which transmits to the decoder a subset of the Slepian-Wolf code bits, with rate equal to the estimated base Slepian-Wolf code rate $R_b$, and waits for the decoder to transmit back a hash value for validation. In step 506, the encoder computes a hash value $H_1$ by applying a hash function to the source signal. In an exemplary embodiment, the hash function used is a numerical computation based on a known public key. In an alternative embodiment, the hash function used is a standard one-way compression function. In the case where a lossy transform is used, the hash function is applied to the reconstructed source signal generated in step 502, instead of to the source signal, to compute the hash value $H_1$.

Once the encoder receives the decoder's hash value $H_2$, in step 507 the encoder decides if the received hash value is valid. In an exemplary embodiment, the hash value $H_2$ is determined to be valid if $H_1$ and $H_2$ are identical. In an alternative embodiment, a second hash function is applied to the hash value $H_2$, and $H_2$ is determined to be valid if the resulting signal is identical to signal $H_1$. In an additional alternative embodiment, step 507 uses a prefixed distance metric and declares that the hash value $H_2$ is valid if the distance between $H_1$ and $H_2$ is lesser than a prefixed threshold.

If the hash value $H_2$ in step 507 is found to be valid, in step 508 the encoder determines if more data is to be transmitted.

If no more data is to be transmitted, the encoder ends transmission in step 520. If more data is to be transmitted, the encoder determines in step 509 if the additional data is to be transmitted in secure mode. If secure mode is required for additional data, the encoder goes to step 501 and re-uses the described secure collaboration method. If secure mode is not required, the encoder transmits additional data without Slepian-Wolf coding in step 510. This process is continued until no more data is to be transmitted in step 508 (or until rate checking fails in step 511), at which point the encoder ends transmission.

If the hash value $H_2$ in step 507 is found to be invalid, step 511 checks if the current Slepian-Wolf coding rate can be incremented. This is done by comparing the sum of the current Slepian-Wolf rate $R_{SW}$ and the incremental Slepian-Wolf rate $R_{inc}$ to the threshold rate $R_{th}$. If $R_{SW}+R_{inc}>R_{th}$, the encoder ends transmission in step 520. Otherwise, the current rate $R_{SW}$ is incremented to $R_{SW}+R_{inc}$, and in step 512, $R_{inc}$ additional bits are transmitted to the decoder. Subsequently, the encoder waits for the decoder to reply with a hash value. Steps 507, 511 and 512 are repeated till either the decoder hash is validated or until transmission ends because the rate cannot be incremented further.

In FIG. 6, the decoder at User B receives as an input, in step 601, the Slepian-Wolf bit-stream transmitted by the encoder, the prior side-information and any prior statistical information about the correlation structure between the source and the possible side-informations. In step 622, these inputs are used to perform Slepian-Wolf decoding, which produces as output the decoded transformed samples. In an exemplary embodiment, step 622 performs maximum-likelihood decoding based on the side-information and the statistics. In an additional embodiment, step 622 uses the belief-propagation algorithm to perform an approximate maximum-likelihood estimate to generate the transform samples. In an additional embodiment, step 622 uses minimum-distance decoding based on only the side-information. In an additional embodiment, the statistics signal consists of knowledge of the form of a parametric probability distribution, and in step 622 the parameters of this distribution are computed, prior to decoding, as a function of the received Slepian-Wolf code rate $R_{SW}$.

The transformed samples generated in step 622 are used in step 623 to reconstruct the source signal. In an exemplary embodiment, when the source signal is an image or video, step 623 involves inverse quantization using a public quantization codebook followed by an inverse discrete cosine transform in order to compute the reconstructed source symbols. In step 624, the reconstructed source signal is used to compute a hash value $H_2$. In an exemplary embodiment, the hash function used is a numerical computation based on the same public key as used by the encoder. In an alternative embodiment, the hash function used is the same one-way compression function as used by the encoder. In step 625, the computed hash value $H_2$ is transmitted back to the encoder, and the decoder waits for validation. In step 626, the decoder checks to determine if the transmission has been ended or not. In case transmission is ended (for example, if the hash value $H_2$ was not validated or if there is no more data to be received), the decoder terminates in step 640. If transmission is not ended, the encoder determines in step 629 if the additional bits are incremental Slepian-Wolf code bits. If so, the decoder receives the additional bits in step 630 and performs Slepian-Wolf decoding and source reconstruction in step 631 using both old and new Slepian-Wolf code bits. The decoder repeats steps 624 and 625, until either transmission is ended or until the current data is completely received and successfully decoded.

When new data is received, the decoder determines in step 627 if the data to be received is in secure mode. If secure mode is being used for additional data, the decoder goes to step 621 and re-uses the described secure collaboration method. If secure mode is not being used, the decoder receives the additional data without Slepian-Wolf decoding in step 628. This process is continued until the encoder ends transmission, at which point the decoder terminates.

While the invention has been described in terms of preferred embodiments, those skilled in the art will recognize that the invention can be practiced with modification within the spirit and scope of the appended claims.

Having thus described our invention, what we claim as new and desire to secure by Letter Patent is follows:

1. A method for secure sharing of data between users comprising the steps of:
   transmitting, by a first user, bits generated by encoding a part of a possibly transformed source signal using a Slepian-Wolf code, and computing a first hash value;
   receiving, by a second user, bits transmitted by the first user; and
   performing, by the second user, Slepian-Wolf decoding of bits transmitted by the first user based on received Slepian-Wolf code information using as input known decoder side information and computing a second hash value which is transmitted to the first user for verification that the side information is correlated to the source signal,
   wherein the side information and the source signal are correlated but distinct.

2. A method according to claim 1, wherein the encoding process which generates the data to be transmitted includes the steps of:
   estimating a Slepian-Wolf rate given a statistical model or a class of statistical models relating the source signal and the side-information data;
   computing the first hash value from the source signal, using a hash function;
   applying a Slepian-Wolf code with the estimated rate, in order to generate Slepian-Wolf bits; and
   comparing the second hash value received from the second user and the first hash value for validation to determine if data transmission is secure.

3. A method according to claim 2, wherein the decoding process to recover the source signal from the transmitted data includes the steps of:
   Slepian-Wolf decoding of data transmitted by the first user given prior side-information and Slepian-Wolf bits received from the first user; reconstructing the source signal from samples generated by Slepian-Wolf decoding;
   computing the second hash value from the source signal reconstruction using a hash function; and
   transmitting the second hash value to the first user for validation.

4. A method according to claim 3, further comprising the steps of:
   applying a second hash function to the second hash value; and
   determining the second hash value to be valid if the resulting value is identical to the first hash value.

5. A method according to claim 3, further comprising the step of determining the second hash value to be valid if a distance between the first hash value and the second hash value, as measured by a predetermined distance metric, is lesser than a prefixed threshold.

6. A method according to claim 2, wherein the hash function is a predetermined one-way compression function.

7. A method according to claim 2, wherein the hash function is a predetermined numerical computation based on a known public-key.

8. A method according to claim 2, wherein the step of estimating Slepian-Wolf rate computes an encoding rate as a function of the source signal, an input statistical model relating the source signal and possible side-information, a sequence length of the source signal, and a code structure of available Slepian-Wolf codes.

9. A method according to claim 2, wherein the source signal undergoes a lossy transform prior to rate estimation, hash function computation, and Slepian-Wolf coding.

10. A method according to claim 9, wherein the source signal consists of multimedia data, and a part of the source signal is transformed using the discrete cosine transform followed by scalar quantization.

11. A method according to claim 2, wherein the output Slepian-Wolf code consists of a mixture of syndrome and parity bits generated using a linear low-density parity check code.

12. A method for secure sharing of data between users comprising the steps of:
transmitting, by a first user, a plurality of code bit sets incrementally, which code bit sets are generated by encoding a part of a possibly transformed source signal using a rateless Slepian-Wolf code and based on one or more hash values received from a second user, and generating and output hash function;
receiving, by the second user, the plurality of code bit sets transmitted incrementally by the first user; and
performing, by the second user, one or more Slepian-Wolf decoding steps based on the plurality of incrementally received Slepian-Wolf code bit sets using as input known decoder side information and computing second hash values which are transmitted to the first user for verification that the side information is correlated to the source signal,
wherein the side information and the source signal are correlated but distinct.

13. A method according to claim 12, wherein the encoding process which generates the data to be transmitted includes the steps of:
performing Slepian-Wolf rate estimation which estimates at least an incremental rate and a threshold rate, given a class of statistical models relating the source signal and side-information data;
computing a first hash value from the source signal, using the generated hash function;
applying a rateless Slepian-Wolf code with the estimated threshold rate, in order to generate Slepian-Wolf bits which can be partitioned into bit-sets for incremental transmission;
incremental transmitting bits until the threshold rate is reached; and for each incremental bit-set transmitted to the second user, comparing second hash values received from the second user and the first hash value for validation to determine if data transmission is secure.

14. A method according to claim 13, wherein the decoding process to recover the source signal from the transmitted code bit sets includes, for each received incremental Slepian-Wolf code bit set, the steps of:
Slepian-Wolf decoding of the source signal given prior side-information and all Slepian-Wolf bits received from the first user; reconstructing the source signal from samples generated by Slepian-Wolf decoding;
computing a second hash value from the source signal reconstruction using a hash function; and
transmitting the second hash value to the first user for validation.

15. A method according to claim 14, wherein the first user decides to transmit an incremental bit-set based on the validation of a hash value received from the second user, the validation performed by applying a hash function to the second hash value received from the second user, and checking if a resulting value is identical to the first hash value computed by the first user, or by determining a distance between the first hash value and the second hash value, as measured by a predetermined distance metric, and comparing said distance to a prefixed threshold.

16. A method according to claim 13, wherein a set of Slepian-Wolf rates are computed, to facilitate incremental transmission, as a function of a class of statistical models relating the source signal and the side-information, the sequence length of the source signal and the code structure of the available Slepian-Wolf codes.

17. A method according to claim 16, wherein a base rate of transmission is determined by computing the expectation of the conditional entropy of the source signal given a decoder side-information over the set of joint probability distributions of the source signal and that side-information, and the base rate is used to determine a number of bits transmitted prior to any bit increments.

18. A method according to claim 13, wherein the Slepian-Wolf bits consist of a mixture of syndrome and parity bits generated by using a linear low-density parity check code, and incremental bit-sets are generated by puncturing a subset of syndrome and parity bits.

19. A system for secure sharing of data between users comprising:
an encoder used by a first user for transmitting bits generated by encoding a part of possibly transformed source signal using a Slepian-Wolf code, and generating a first hash value; and
a decoder used by a second user for performing Slepain-Wolf decoding based on received Slepain-Wolf code information received from the encoder using as input known decoder side information and generating a second hash value which is transmitted to the encoder for verification that the side information is correlated to the source signal,
wherein the side information and the source signal are correlated but distinct.

20. A symmetric system for secure sharing of data between users where each of at least two users both have an encoder and a decoder comprising:
an encoder for transmitting bits generated by encoding a part of a possibly transformed source signal using a Slepian-Wolf code, and generating a first hash value; and
a decoder for performing Slepian-Wolf decoding based on the received Slepian-Wolf code using as input known decoder side information and generating a second hash value which is transmitted to a corresponding encoder from which Slepian-Wolf code information is received for verification that the side information is correlated to the source signal,
wherein the side information and the source signal are correlated but distinct.

* * * * *